July 29, 1952 R. M. FLANAGAN 2,604,904
ROTARY VALVE
Original Filed Jan. 9, 1945
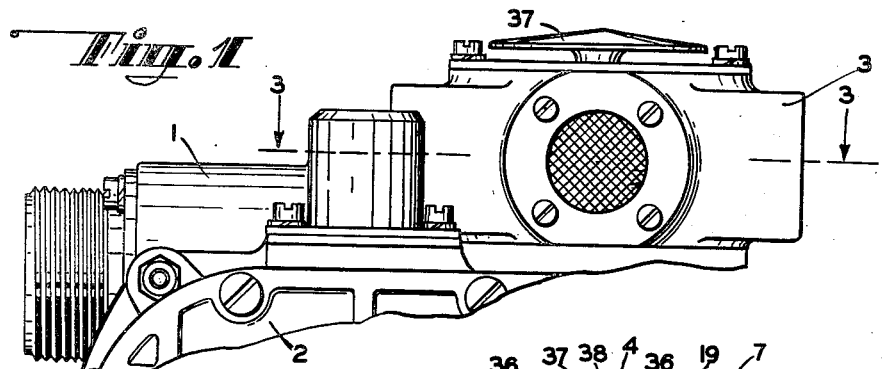
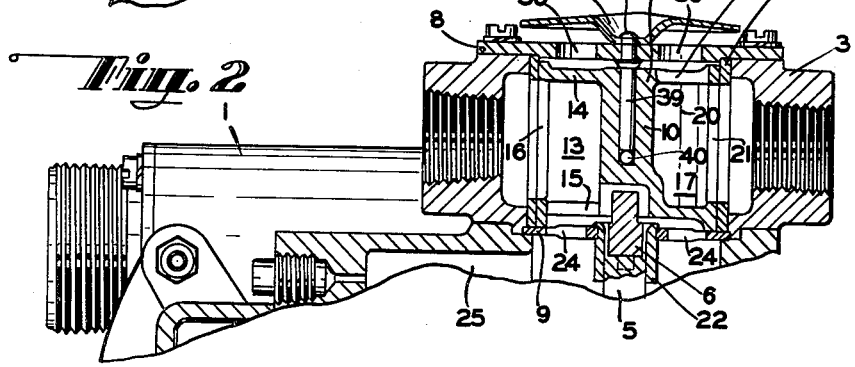
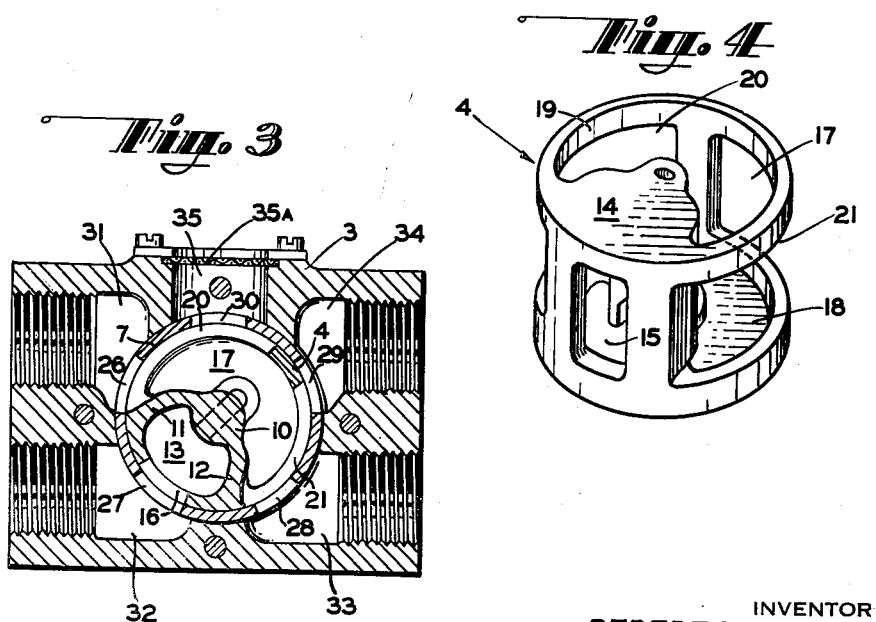
INVENTOR
ROBERT M. FLANAGAN
BY
Herbert Londais Jr.
ATTORNEY Patented July 29, 1952

2,604,904

UNITED STATES PATENT OFFICE 2,604,904

ROTARY VALVE

Robert Michael Flanagan, Morris Plains, N. J., assignor to Bendix Aviation Corporation, Teterboro, N. J., a corporation of Delaware Original application January 9, 1945, Serial No. 572,017, now Patent No. 2,542,863, dated February 20, 1951. Divided and this application December 23, 1946, Serial No. 717,839

1 Claim. (Cl. 137—624)

The present application is a division of my copending application Ser. No. 572,017 filed January 9, 1945 now Patent No. 2,542,863 of February 20, 1951, and relates to improved air distributor mechanism for operating inflatable elements of the type mounted on airfoil surfaces of an aircraft for eliminating and preventing the accumulation of ice on such surfaces.

An object of the invention is to provide a novel compact rotary air distributor valve mechanism for controlling the inflation and deflation of the inflatable elements.

Another object of the invention is to provide a novel stem and antifriction ball bearing for mounting the rotary valve so as to prevent side and end air pressures from causing adverse frictional effects between the rotary valve and the sleeve within which the same is rotatably mounted.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claim for this purpose.

Figure 1 is a fragmentary side view of the distributor valve mechanism.

Figure 2 is a longitudinal sectional view of the distributor valve mechanism of Figure 1.

Figure 3 is a sectional view of the distributor valve mechanism taken along the lines 3—3 of Figure 1.

Figure 4 is a perspective view of the distributor valve.

Referring to the drawing of Figure 1, there is provided a main casting 1 which carries a suitable electric motor for operating an air pump 2 and an air distributor valve mechanism having a housing indicated generally by the numeral 3. The housing 3 has rotatably mounted therein, as shown in Figure 2, a rotary valve 4. The rotary valve 4 is driven by the motor through a shaft 5 and a snap action spring actuating mechanism not shown herein. The snap action mechanism is shown and described in detail in the copending parent application Ser. No. 572,017 filed January 9, 1945.

The latter mechanism effects the actuation of the shaft 5 with a snap action so as to adjustably position the cylindrical air distributor valve 4 which is connected to the shaft 5 through a floating spline 6.

The distributor valve 4 as shown in Figure 2 is rotatably mounted in a sleeve 7 positioned within the housing 3. The housing 3 is affixed to the main casting 1 by suitable bolts which also serve to fasten to the housing 3 a top plate 8 positioned at the upper end of the rotatable distributor valve 4. At the opposite or lower end of the distributor valve 4 as shown in Figure 2, there is provided a plate 9.

The valve 4, as shown in Figures 2 and 3, has provided a stem 10 from which radially projects wall portions 11 and 12 forming a segmental chamber 13 which is closed at the upper end, as viewed in Figures 2 and 4 by a wall 14 and open at the lower end by a port 15. The valve 4 has a port 16 opening through the cylindrical wall of the valve 4 into the chamber 13. Separated by the wall portions 11 and 12 from the chamber 13, is a second chamber 17 which is closed at the lower end by a wall portion 18 and open at the upper end by a port 19. Ports 20 and 21 open through the cylindrical wall of the valve 4 into the chamber 17.

A sleeve 22 projects through the plate 9 and is fixedly mounted thereto. The drive shaft 5 is rotatably mounted at one end in the sleeve 22 and is drivingly connected to the valve 4 through means of the floating spline 6 as previously explained.

Openings 24 are provided in the plate and lead into the opening 15 in the valve 4 from a passage 25 formed in the casting 1 and leading from the air pump 2 as shown and described in detail in the aforenoted parent application.

As shown in Figure 3, the valve 4 is rotatably mounted within the sleeve 7 which has provided therein ports 26, 27, 28, 29 and 30 opening into passages 31, 32, 33, 34 and 35, respectively, formed in the housing 3. The passages 31, 32, 33 and 34 are connected by suitable air pressure conduits to inflatable elements, not shown, mounted on airfoil surfaces of an aircraft for eliminating ice therefrom, while the passage 35 opens to the atmosphere through a suitable screen 35a fastened at the outer side of the housing 3.

The valve 4 is actuated with a snap action so that the port 16 successively registers with the ports 26, 27, 28, 29 and 30. Thus the passages 31, 32, 33, 34 and 35 are successively connected with the air pressure in the passage 25. The respective inflatable elements or boots operably connected to the passages 31, 32, 33 and 34 are successively inflated. The passage 35 which opens to the atmosphere provides a necessary time delay between cycles of operation of the inflatable elements and also provides means for periodically exhausting the air from the passage 25 to the atmosphere so as to effect cooling of the unit, and also serves as the home position for the valve when not in operation so that all the boots of the ice eliminating system may be completely deflated at such time.

It will be further noted that as the valve 4 is actuated by the shaft 5 in a counterclockwise direction, as viewed in Figure 3 the port 16 is successively moved out of registration with the ports 27, 28, 29 and 30 and such ports are successively opened to the atmosphere by port 20 as the port 16 is moved out of registration with such ports. Thus the inflatable elements are inflated upon the port 16 registering with the corresponding ports 26, 27, 28 and 29 and deflated upon the port 20 registering with such ports.

The port 20 opens into chamber 17 of the valve 4. The chamber 17 has a port 19 at the upper end of the valve 4 through which the exhaust air passes from the inflated boot and out ports 36 formed in the end plate 8. A deflector plate 37 is mounted at the exterior of the plate 8 and fastened to the plate 8 by a rivet or bolt 38 having an inner end stem portion 39 upon which the valve 4 freely rotates. The end of the stem 39 rests upon an antifriction ball bearing 40. The latter stem 39 and ball bearing 40 arrangement serves to prevent side and end air pressures from causing adverse frictional effects between the valve 4 and the sleeve 7 and the top plate 8.

It will be seen that through the valve 4 the inflatable elements may be successively inflated and deflated. The port 16 of the valve 4 being actuated with a snap action into registering relation from one of the ports in the sleeve 7 to the next succeeding port.

The snap action operation of the valve 4 is effected through the operation of a snap action escapement mechanism shown and described in the copending parent application Ser. No. 572,017 filed January 9, 1945.

It will be readily seen from the foregoing that there is provided a novel compact air distributor valve mechanism for controlling the operation of inflatable elements for removing ice from airfoil surfaces of an aircraft.

Although only one embodiment of the invention has been illustrated and described, various changes in the form and relative arrangements of the parts, which will now appear to those skilled in the art, may be made without departing from the scope of the invention. Reference is, therefore, to be had to the appended claim for a definition of the limits of the invention.

What is claimed is:

A fluid distributor mechanism comprising, in combination, a housing, a rotary valve member for rotation in said housing, a fluid pressure inlet conduit at one end of said housing and opening into said valve member, fluid pressure conduits disposed in said housing around said valve member and opening radially from said valve member, an end plate at the other end of said housing and having fluid pressure outlet openings leading from said valve member to atmosphere, a fluid pressure outlet deflector plate positioned in spaced relation to said outlet openings, a stem affixing said deflector plate to said end plate and having a free end portion thereof projecting concentrically into said rotary valve member for supporting said valve member, a ball bearing positioned in said valve member between the free end of said stem and said rotary valve for supporting said valve member from end thrust under fluid pressure at said one end.

ROBERT MICHAEL FLANAGAN.

REFERENCES CITED

The following references are of record in the file of this patent:

UNITED STATES PATENTS

| Number | Name | Date |
| --- | --- | --- |
| 2,100,154 | Ashton | Nov. 23, 1937 |
| 2,325,956 | Holtman | Aug. 3, 1943 |
| 2,327,046 | Hunter | Aug. 17, 1943 |
| 2,327,419 | Grandy | Aug. 24, 1943 |
| 2,367,319 | Wahlberg | Jan. 16, 1945 |